(12) United States Patent
Jinno

(10) Patent No.: US 10,893,193 B2
(45) Date of Patent: Jan. 12, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Takayuki Jinno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 2 days.

(21) Appl. No.: 16/272,486

(22) Filed: Feb. 11, 2019

(65) Prior Publication Data

US 2019/0268535 A1    Aug. 29, 2019

(30) Foreign Application Priority Data

Feb. 28, 2018 (JP) .................................. 2018-035568

(51) Int. Cl.
| | |
|---|---|
| *H04N 5/232* | (2006.01) |
| *H04N 9/69* | (2006.01) |
| *H04N 1/60* | (2006.01) |
| *H04N 1/54* | (2006.01) |

(52) U.S. Cl.
CPC .......... *H04N 5/23229* (2013.01); *H04N 1/54* (2013.01); *H04N 1/6019* (2013.01); *H04N 5/23222* (2013.01); *H04N 5/23296* (2013.01); *H04N 9/69* (2013.01)

(58) Field of Classification Search
CPC .......... H04N 5/23229; H04N 5/23296; H04N 1/6019; H04N 9/69; H04N 1/54; H04N 5/23222; H04N 5/232945; H04N 5/2258; H04N 1/6005; H04N 1/6027
See application file for complete search history.

(56) References Cited

U.S. PATENT DOCUMENTS

| | | | | |
|---|---|---|---|---|
| 5,223,951 | A * | 6/1993 | Umakoshi ............ | H04N 1/4095 358/406 |
| 2005/0062854 | A1 | 3/2005 | Shiraishi | |
| 2005/0093992 | A1 * | 5/2005 | Fukumoto ................. | G06T 7/90 348/222.1 |
| 2010/0323282 | A1 * | 12/2010 | Uno .......................... | G03F 1/70 430/5 |
| 2011/0242352 | A1 * | 10/2011 | Hikosaka ............. | H04N 5/3572 348/222.1 |

(Continued)

FOREIGN PATENT DOCUMENTS

JP    2005-065054 A    3/2005

*Primary Examiner* — Hung H Lam
(74) *Attorney, Agent, or Firm* — Canon U.S.A., Inc. IP Division

(57) ABSTRACT

An image processing apparatus includes a first acquisition unit configured to acquire first data based on a first image that includes a high-luminance region and a second image that includes an overlapping region with the first image and that does not include the high-luminance region, the first data representing flare distribution in the overlapping region in the first image, a second acquisition unit configured to acquire second data representing a position of the high-luminance region in the first image, a generation unit configured to generate third data representing flare distribution in the first image based on the first data and the second data, and a correction unit configured to correct the first image based on the third data.

20 Claims, 20 Drawing Sheets

(56) References Cited

U.S. PATENT DOCUMENTS

| | | | |
|---|---|---|---|
| 2013/0050519 A1* | 2/2013 | Lee | H04N 5/2355 348/222.1 |
| 2014/0306951 A1* | 10/2014 | Toiyama | G06T 5/005 345/419 |
| 2018/0302544 A1* | 10/2018 | Dhiman | G06T 7/246 |

* cited by examiner

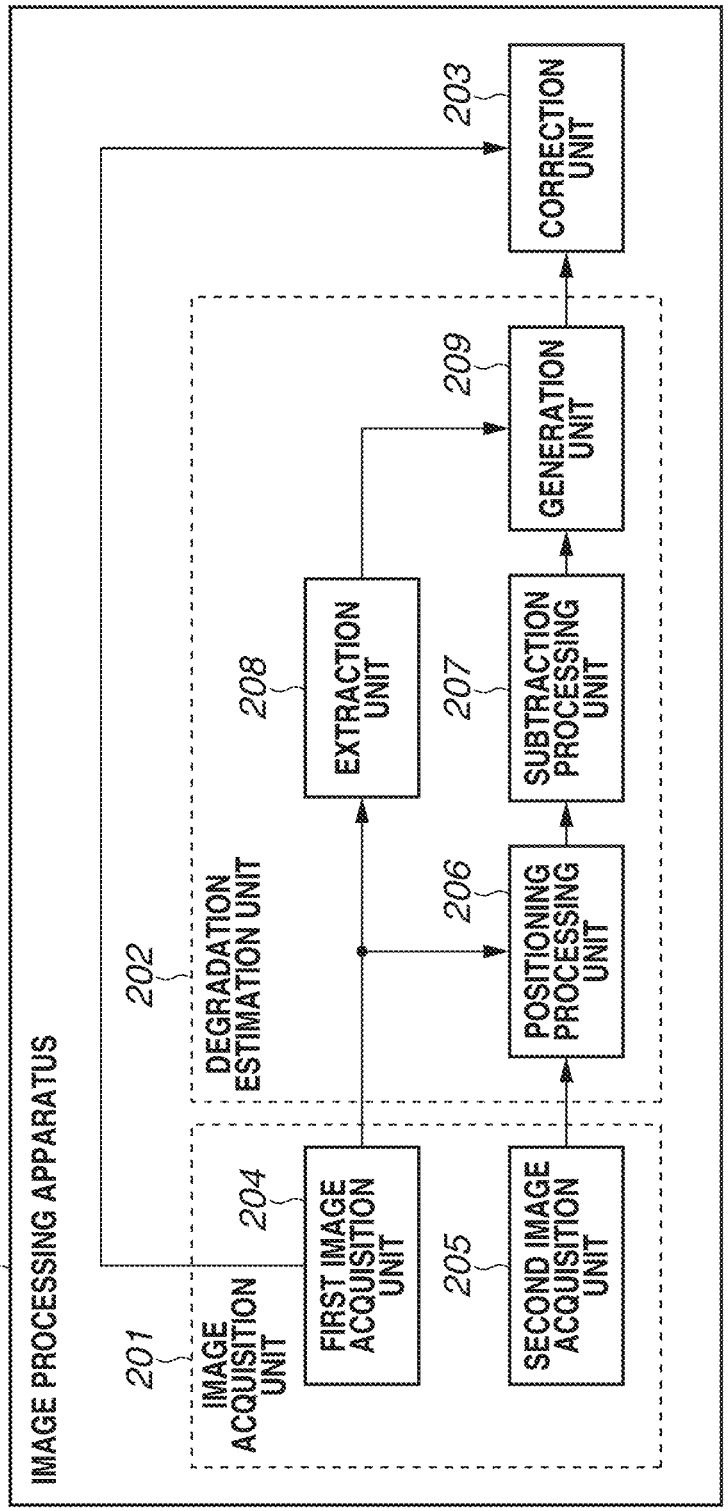

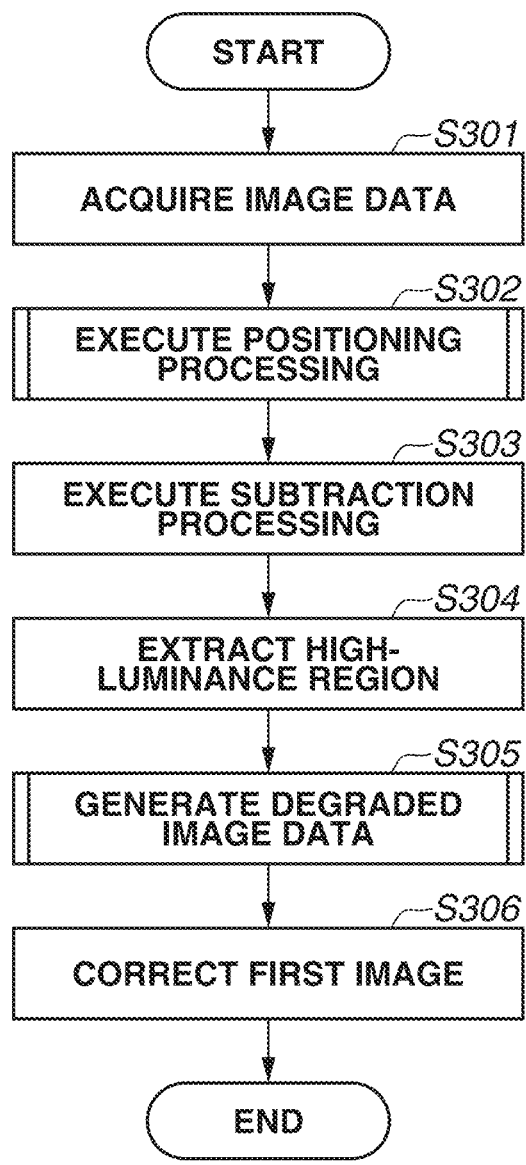

FIG.6A
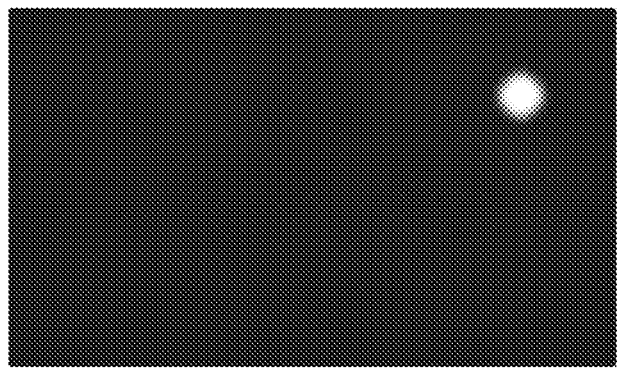
FIG.6B
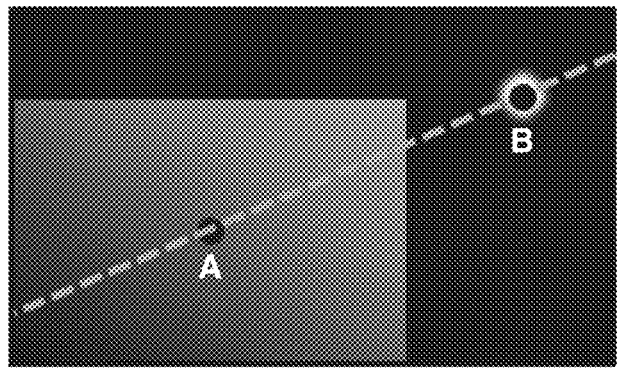
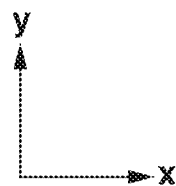
FIG.6C
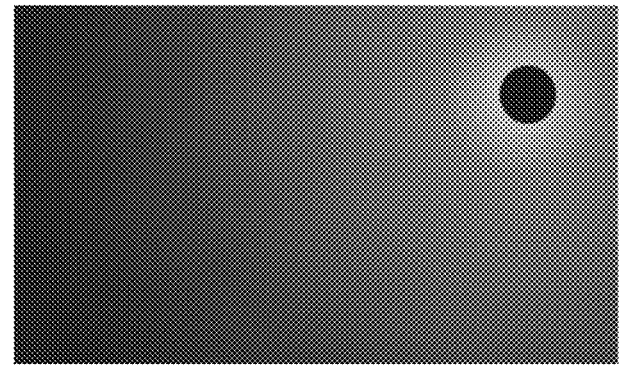

FIG.11

| R | G | B | R' | G' | B' |
|---|---|---|---|---|---|
| 115 | 82 | 68 | 122 | 89 | 73 |
| 194 | 150 | 130 | 200 | 156 | 136 |
| 98 | 122 | 157 | 105 | 127 | 162 |
| 87 | 108 | 67 | 92 | 114 | 72 |
| 133 | 128 | 177 | 138 | 135 | 182 |
| 103 | 189 | 170 | 108 | 194 | 176 |
| 214 | 126 | 44 | 221 | 133 | 51 |
| 80 | 91 | 166 | 86 | 97 | 171 |
| 193 | 90 | 99 | 199 | 96 | 104 |
| 94 | 60 | 108 | 101 | 65 | 114 |
| 157 | 188 | 64 | 164 | 194 | 71 |
| 224 | 163 | 46 | 231 | 168 | 51 |
| 56 | 61 | 150 | 61 | 66 | 156 |
| 70 | 148 | 73 | 77 | 153 | 79 |
| 175 | 54 | 60 | 180 | 60 | 65 |
| 231 | 199 | 31 | 237 | 206 | 36 |
| 187 | 86 | 149 | 193 | 91 | 155 |
| 8 | 133 | 161 | 14 | 138 | 167 |
| 243 | 243 | 242 | 248 | 249 | 248 |
| 200 | 200 | 200 | 207 | 205 | 207 |
| 160 | 160 | 160 | 165 | 166 | 167 |
| 122 | 122 | 121 | 128 | 128 | 127 |
| 85 | 85 | 85 | 92 | 90 | 91 |
| 52 | 52 | 52 | 57 | 59 | 59 |

IMAGE PROCESSING APPARATUS, IMAGE PROCESSING METHOD, AND STORAGE MEDIUM

BACKGROUND

Field of the Disclosure

The present disclosure relates to an image processing technique for reducing image quality degradation.

Description of the Related Art

It has been known that, in a case where a high-luminance object, such as the sun, is imaged, image quality degradation, such as flare, is caused in an image obtained by the imaging. Japanese Patent Application Laid-Open No. 2005-065054 discusses a technique for changing a table for gamma correction to be performed on the entire image based on flare characteristics and a zoom position of a lens.

An occurrence degree of the flare is different for each region in the image depending on a position and luminance of the high-luminance object in the image. Thus, the flare cannot be reduced with high accuracy only by conversion of the table for gamma correction.

SUMMARY

The present disclosure is directed to an image processing technique for reducing image quality degradation caused by a high-luminance object with high accuracy.

In some embodiments, an image processing apparatus includes a first acquisition unit configured to acquire first data based on a first image that includes a high-luminance region and a second image that includes an overlapping region with the first image and that does not include the high-luminance region, the first data representing flare distribution in the overlapping region in the first image, a second acquisition unit configured to acquire second data representing a position of the high-luminance region in the first image, a generation unit configured to generate third data representing flare distribution in the first image based on the first data and the second data, and a correction unit configured to correct the first image based on the third data.

Further features of various embodiments will become apparent from the following description of exemplary embodiments with reference to the attached drawings.

BRIEF DESCRIPTION OF THE DRAWINGS

FIGS. 1A and 1B are block diagrams each illustrating a configuration example of an image processing apparatus.

FIG. 2 is a flowchart illustrating a flow of processing executed by the image processing apparatus.

FIGS. 6A to 6C are diagrams each illustrating processing to generate degraded image data.

FIG. 11 is a table illustrating an example of a color collection lookup table (LUT).

DESCRIPTION OF THE EMBODIMENTS

Exemplary embodiments are described below with reference to the drawings. The following exemplary embodiments, however, do not necessarily limit all embodiments. Further, all combinations of characteristics described in the exemplary embodiments are not necessarily essential for the solution in all embodiments.

A phenomenon in which a captured image is colored or brightened due to multiple reflections that occurred on a lens, a lens barrel, an imaging device, various kinds of filters, and a cover glass included in an imaging apparatus; diffraction on an objective lens; and the like has been known. The phenomenon is called flare. In addition, as one kind of flare, there is a phenomenon in which a strong light image appears on a straight line passing through an image of a high-luminance object and a center of the image. The phenomenon is called ghost. Such image quality degradation occurs particularly due to the fact that the high-luminance object is included in an imaging range. To solve this problem, in a first exemplary embodiment, an image not including a high-luminance object is used to reduce image quality degradation in an image including a high-luminance object.

<Hardware Configuration of Image Processing Apparatus>

Figure 1A:
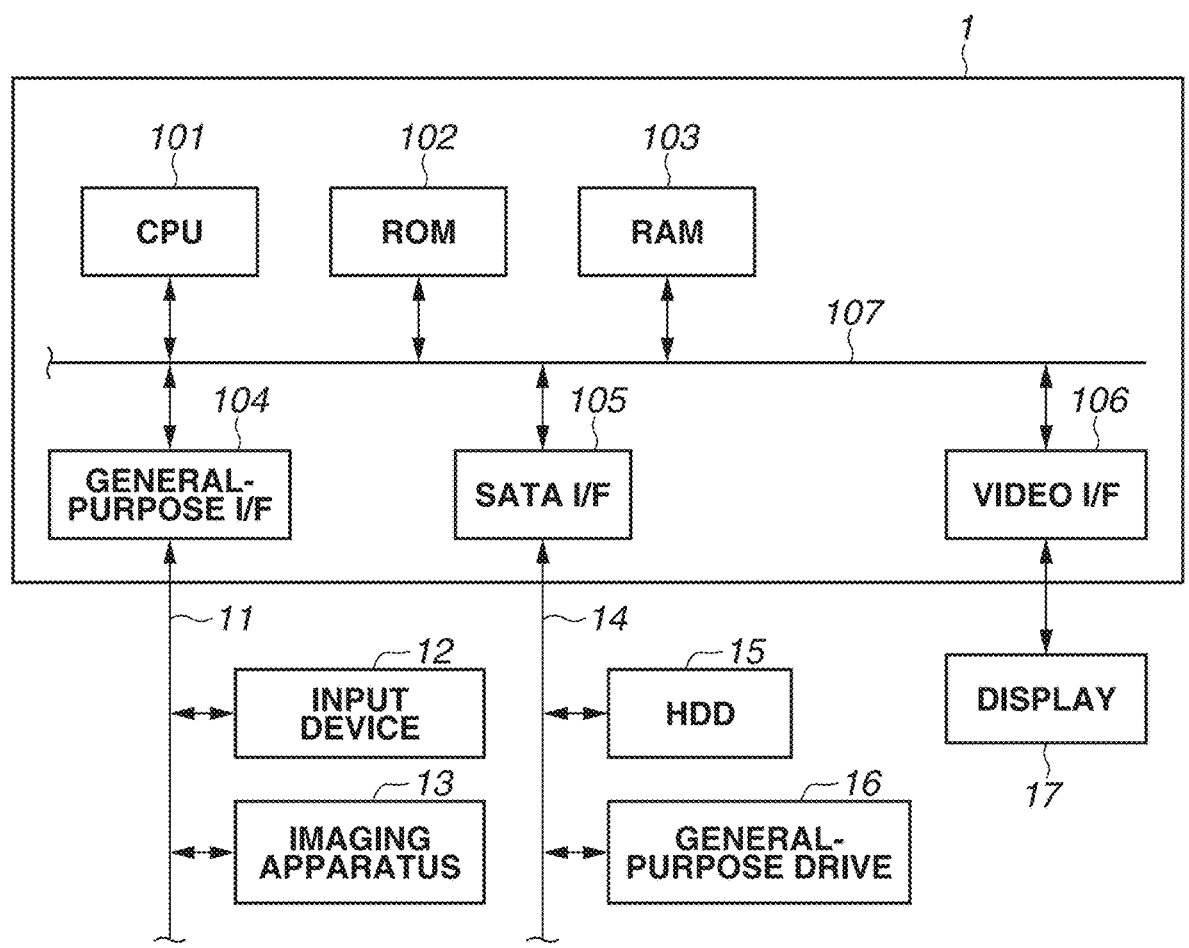

FIG. 1A illustrates an example of a hardware configuration of an image processing apparatus 1. The image processing apparatus 1 is, for example, a computer, and includes a central processing unit (CPU) 101, a read-only memory (ROM) 102, and a random access memory (RAM) 103. The CPU 101 uses the RAM 103 as a working memory to execute an operating system (OS) and various kinds of programs stored in the ROM 102 and a hard disk drive (HDD) 15. Further, the CPU 101 controls these components via a system bus 107. Processing in a flowchart described below is executed by the CPU 101 loading program codes stored in the ROM 102, the HDD 15, etc. into the RAM 103 and by the CPU 101 executing the loaded program codes. A general-purpose interface (IF) 104 is connected to an input device 12, such as a mouse and a keyboard, and an imaging apparatus 13 via a serial bus 11. A serial advanced technology attachment (SATA) I/F 105 is connected, via a serial bus 14, to the HDD 15 and a general-purpose drive 16 that performs reading and writing of various kinds of recording media. The CPU 101 uses the HDD 15 and various kinds of recording media mounted on the general-purpose drive 16 as storages of various kinds of data. A display 17 is connected to a video I/F 106. The CPU 101 displays a user interface (UI) provided by a program on the display 17, and receives an input of a user instruction, etc. via the input device 12. The image processing apparatus 1 may be included in the imaging apparatus 13.

<Functional Configuration of Image Processing Apparatus>

FIG. 1B illustrates an example of a functional configuration of the image processing apparatus 1. The image processing apparatus 1 includes an image acquisition unit 201, a degradation estimation unit 202, and a correction unit 203.

The image acquisition unit 201 includes a first image acquisition unit 204 and a second image acquisition unit 205. The first image acquisition unit 204 acquires image data representing an image to be corrected, and the first image acquisition unit 204 transmits the acquired image data to the degradation estimation unit 202 and the correction unit 203. Hereinafter, the image to be corrected is referred to as a first image, and the image data representing the image to be corrected is referred to as first image data. The first image includes a high-luminance region. The second image acquisition unit 205 acquires image data representing an image for correction and transmits the acquired image data to the degradation estimation unit 202. Hereinafter, the image for correction is referred to as a second image, and the image data representing the image for correction is referred to as second image data. The second image does not include a high-luminance region, and the second image includes an overlapping region with the first image. The first image and the second image according to the present exemplary embodiment are both grayscale images; however, they may also be color images. In a case where color images are used, the processing described below is performed on each of channels of R, G, and B for corresponding pixels.

The degradation estimation unit 202 estimates a degree of image quality degradation in the first image. The degradation estimation unit 202 includes a positioning processing unit 206, a subtraction processing unit 207, an extraction unit 208, and a generation unit 209. The positioning processing unit 206 performs positioning processing on the second image so as to match a position of an object included in the first image with a position of the object included in the second image using the first image as a reference. In addition, the positioning processing unit 206 transmits the first image data and the second image data representing the second image subjected to the positioning processing to the subtraction processing unit 207. The subtraction processing unit 207 subtracts pixel values of the overlapping region in the second image subjected to the positioning processing from pixel values of the overlapping region in the first image. Then, the subtraction processing unit 207 transmits the first image data representing the first image subjected to the subtraction processing to the generation unit 209. The first image subjected to the subtraction processing represents a distribution of a degree of image quality degradation in the overlapping region of the first image and the second image subjected to the positioning processing. The extraction unit 208 extracts the high-luminance region in the first image, and the extraction unit 208 transmits information that represents a position of the extracted region and pixel values in the extracted region to the generation unit 209. The generation unit 209 generates degraded image data representing the distribution of the degree of image quality degradation in the first image based on the first image data representing the first image subjected to the subtraction processing and the information that represents the position and the pixel values of the high-luminance region in the first image. Then, the generation unit 209 transmits the degraded image data to the correction unit 203. The correction unit 203 corrects the first image based on the first image data and the degraded image data.

<Processing Executed by Image Processing Apparatus>

FIG. 2 is a flowchart illustrating a flow of processing executed by the image processing apparatus 1.

In S301, the image acquisition unit 201 acquires the first image data representing the first image to be corrected and acquires the second image data representing the second image used for correction of the first image. More specifically, the first image acquisition unit 204 acquires the first image data and transmits the acquired first image data to the correction unit 203, the positioning processing unit 206, and the extraction unit 208. The second image acquisition unit 205 acquires the second image data and transmits the acquired second image data to the positioning processing unit 206. At this time, the first image acquisition unit 204 and the second image acquisition unit 205 acquire the first image data and the second image data, respectively, that are preliminary stored in a storage device, such as the HDD 15. An imaging method to obtain the first image data and the second image data is described below.

Figure 3A:
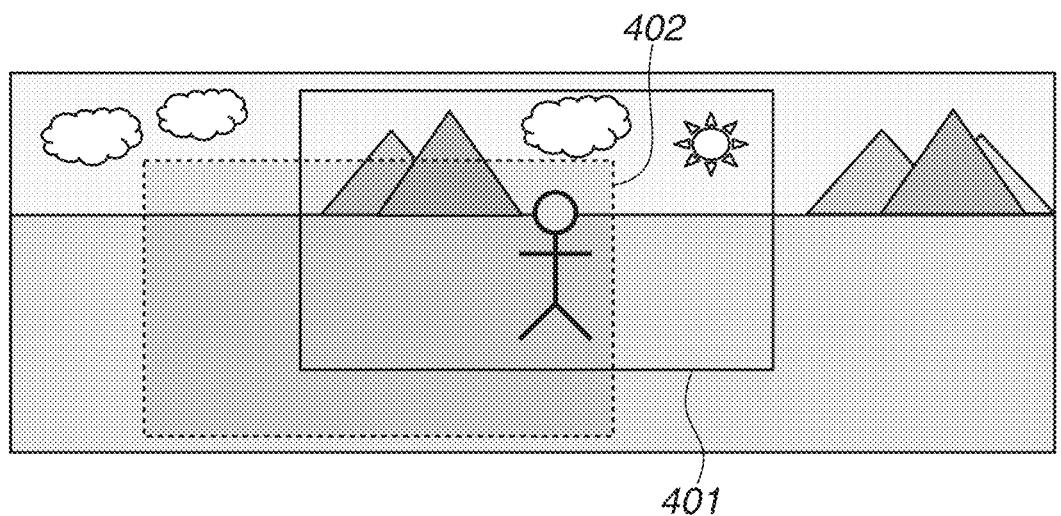
FIGS. 3A to 3C are diagrams each illustrating an example of a captured image.
Figure 3B:
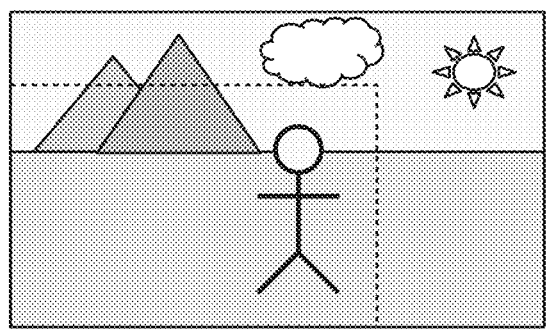
Figure 3C:
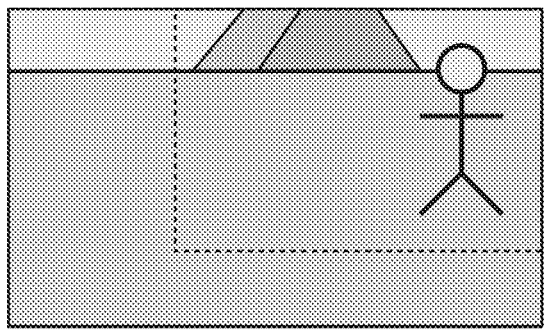

FIGS. 3A to 3C are diagrams each illustrating an example of the captured image according to the present exemplary embodiment. FIG. 3A is a diagram illustrating a state where a target scene is imaged twice with different imaging ranges. An imaging range 401 is an imaging range including the sun as a high-luminance object. An imaging range 402 is an imaging range not including the sun. FIG. 3B illustrates the captured image of the imaging range including the sun in FIG. 3A. FIG. 3C illustrates the captured image of the imaging range not including the sun in FIG. 3A. The captured image illustrated in FIG. 3B and the captured image illustrated in FIG. 3C are images obtained by imaging at the same zoom magnification under the same exposure condition. The captured image illustrated in FIG. 3C does not include the sun as the high-luminance object in the imaging range. Thus, an occurrence amount of flare is small and a brightness of the same object is low compared with the captured image illustrated in FIG. 3B. Dotted lines in FIG. 3B and FIG. 3C indicate a region where the imaging ranges overlap with each other.

Figure 4A:
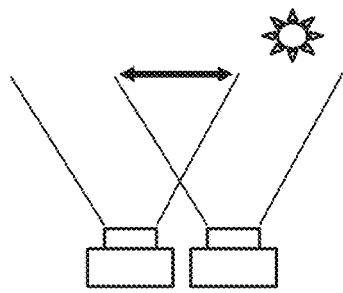
FIGS. 4A to 4C are diagrams each illustrating a method of changing an imaging range.
Figure 4B:
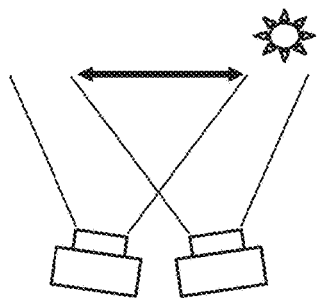
Figure 4C:
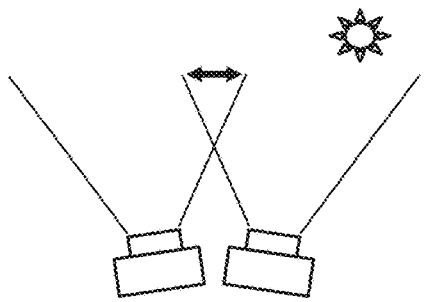

A method of changing the imaging range is described with reference to FIGS. 4A to 4C. FIG. 4A illustrates an example in which the imaging range is changed by moving the imaging apparatus in parallel. FIG. 4B and FIG. 4C each illustrate an example in which the imaging range is changed by rotationally moving the imaging apparatus. The parallel movement in FIG. 4A is performed in, for example, panoramic imaging. The rotational movement in FIG. 4B is applied as, for example, a part of an imaging system that images the same object from various angles to generate a virtual viewpoint image. The rotational movement in FIG. 4C is applied as a part of an imaging system that images, for example, the whole sky. In each of the examples, the imaging range of the imaging apparatus on right side includes the sun as the high-luminance object, and the imaging range of the imaging apparatus on left side does not include the sun. In each of FIGS. 4A to 4C, a range indicated with an arrow is an overlapping region of two imaging ranges. The first image data according to the present exemplary embodiment is image data obtained through imaging using the imaging apparatus on the right side, and the second image data according to the present exemplary embodiment is image data obtained through imaging using the imaging apparatus on the left side. The imaging apparatus on the left side and the imaging apparatus on the right side may be the same imaging apparatus or different imaging apparatuses as long as the exposure condition is the same.

Figure 17:
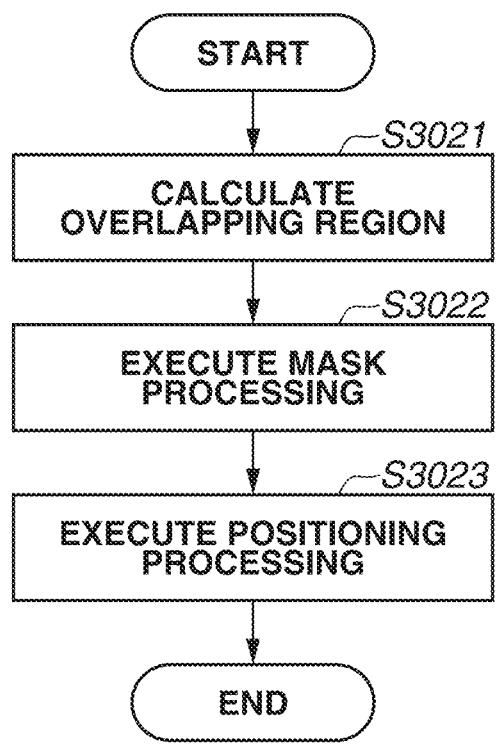
FIG. 17 is a flowchart illustrating a flow of the positioning processing.

In S302, the positioning processing unit 206 executes the positioning processing based on the first image data and the second image data. Processing contents of the positioning processing in this operation is described with reference to FIGS. 5A to 5D and FIG. 17. FIG. 17 is a flowchart illustrating a flow of the positioning processing in S302.

In S3021, the positioning processing unit 206 calculates the overlapping region of the first image and the second image. More specifically, the positioning processing unit 206 performs known-pattern-matching processing in which a characteristic point of the first image and a characteristic point of the second image are extracted to calculate the overlapping region. For example, the characteristic point may be a region where luminance or variation of the luminance is larger than a predetermined threshold. Alternatively, the pattern matching may be performed by calculating a characteristic amount for each region in each of the images. A method of calculating the overlapping region is not limited to the pattern matching. For example, the overlapping region of the first image and the second image may be calculated by geometric calculation using an imaging position and a viewing angle to obtain the first image and an imaging position and a viewing angle to obtain the second image.

Figure 5A:
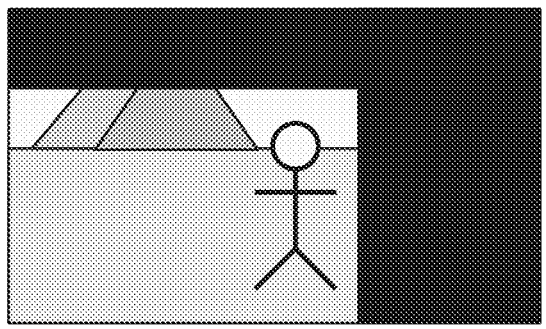
FIGS. 5A to 5D are diagrams each illustrating positioning processing and subtraction processing.
Figure 5B:
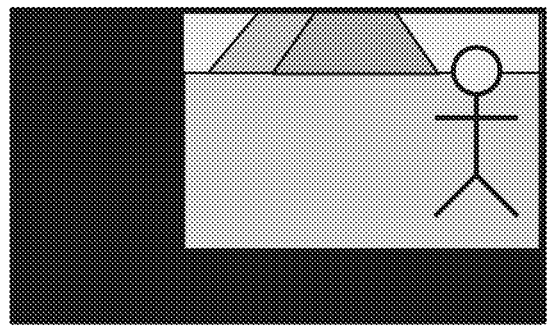

In S3022, the positioning processing unit 206 executes mask processing on a region other than the overlapping region calculated in S3021 in the first image and the second image. The mask processing according to the present exemplary embodiment is processing to set the pixel values to zero (black). FIG. 5A and FIG. 5B each illustrate an image in which the mask processing has been performed on a region other than the overlapping region. The image illustrated in FIG. 5A is an image in which the pixel values of the region other than the overlapping region in the first image are set to zero. The image illustrated in FIG. 5B is an image in which the pixel values of the region other than the overlapping region in the second image are set to zero.

Figure 5C:
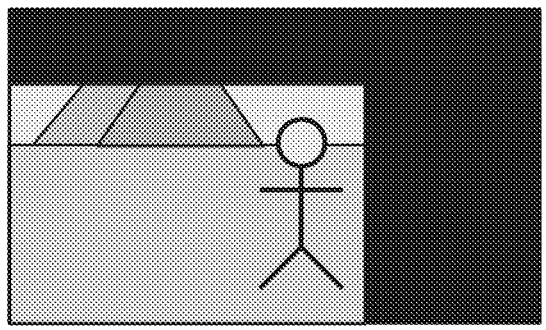

In S3023, the positioning processing unit 206 executes the positioning processing on the second image so that the overlapping region of the first image and the overlapping region of the second image match with each other using the first image as a reference. More specifically, the positioning processing unit 206 calculates a transformation matrix used for affine transformation by using the first image and the second image, and the positioning processing unit 206 performs the positioning processing by using the calculated transformation matrix. FIG. 5C illustrates the second image subjected to the positioning processing so that the overlapping region of the first image subjected to the mask processing and the overlapping region of the second image subjected to the mask processing match with each other. The transformation method to perform the positioning is not limited to the affine transformation. For example, a known phase only correlation (POC) may be used. The positioning processing in S3023 may be performed without performing the mask processing in S3022.

Figure 5D:
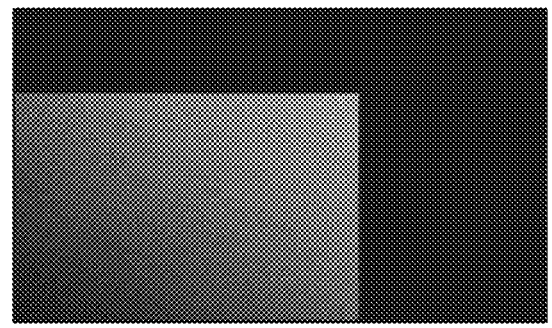

In S303, the subtraction processing unit 207 subtracts the pixel values of the overlapping region of the second image subjected to the positioning processing from the pixel values of the overlapping region of the first image based on the first image data and the second image data subjected to the positioning processing. In addition, the subtraction processing unit 207 transmits the first image data representing the first image subjected to the subtraction processing to the generation unit 209. FIG. 5D illustrates the first image subjected to the subtraction processing. If the pixel values become lower than zero due to the subtraction, the pixel values are clipped at zero. As described above, the first image subjected to the subtraction processing represents a distribution of the degree of image quality degradation in the overlapping region of the first image and the second image subjected to the positioning processing.

In S304, the extraction unit 208 extracts the high-luminance region in the first image and transmits information that indicates the position of the extracted region and the pixel values in the extracted region to the generation unit 209. More specifically, the extraction unit 208 extracts, as the high-luminance region, a region where each of the pixel values is larger than a predetermined threshold in the first image. In addition, the extraction unit 208 generates, as the information that indicates the position of the extracted region and the pixel values in the extracted region, extracted image data that represents the first image in which the mask processing has been performed on the region other than the extracted high-luminance region (extracted image). FIG. 6A illustrates a result of extraction of the high-luminance region, i.e., the position and the pixel values corresponding to the high-luminance object, from the first image. The pixel values of the region other than the region corresponding to the sun (white) as the high-luminance object are zero (black), and the pixel values indicating a brightness of the sun are recorded in the region corresponding to the sun (white). The information indicating the position of the extracted region and the pixel values of the extracted region is not limited to the extracted image data. For example, the information may be point cloud data in which positions of the pixels corresponding to the extracted high-luminance region are associated with the pixel values at the pixel positions.

Figure 18:
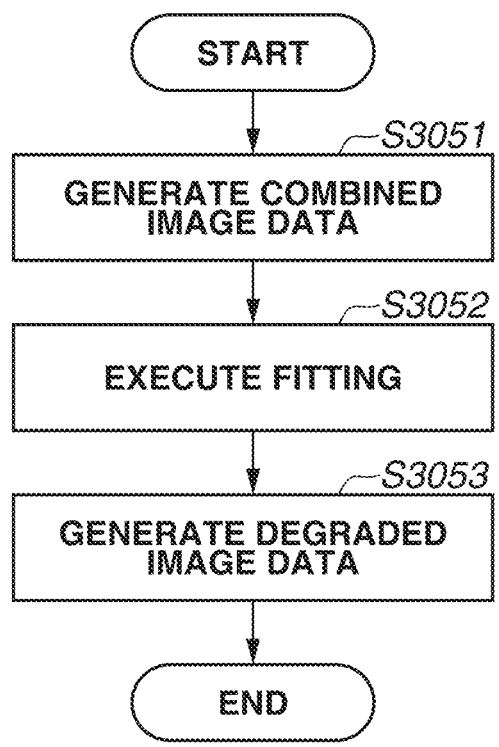
FIG. 18 is a flowchart illustrating a flow of the processing to generate degraded image data.

In S305, the generation unit 209 generates degraded image data that represents the distribution of the degree of image quality degradation in the first image based on the first image data representing the first image subjected to the subtraction processing and on the extracted image data. In addition, the generation unit 209 transmits the degraded image data to the correction unit 203. Contents of the processing to generate the degraded image data in this operation are described with reference to FIGS. 6A to 6C, FIGS. 7A to 7C, and FIG. 18. FIG. 18 is a flowchart illustrating a flow of the processing to generate the degraded image data.

In S3051, the generation unit 209 combines the first image subjected to the subtraction processing and the image represented by the extracted image data. More specifically, the generation unit 209 generates combined image data representing an image (combined image) in which the pixel values of the first image subjected to the subtraction processing are recorded in the overlapping region, and the pixel values of the extracted image represented by the extracted image data are recorded in the region other than the overlapping region. FIG. 6B illustrates the combined image obtained by combining the first image subjected to the subtraction processing and the extracted image. In the combining processing, newly generating the image data as described above is not necessarily required. In a case where both the first image subjected to the subtraction processing and the extracted image have been subjected to the above-described mask processing, the pixel values of one of the images may be added to the pixel values of the other image to acquire the combined image data.

Figure 7A:
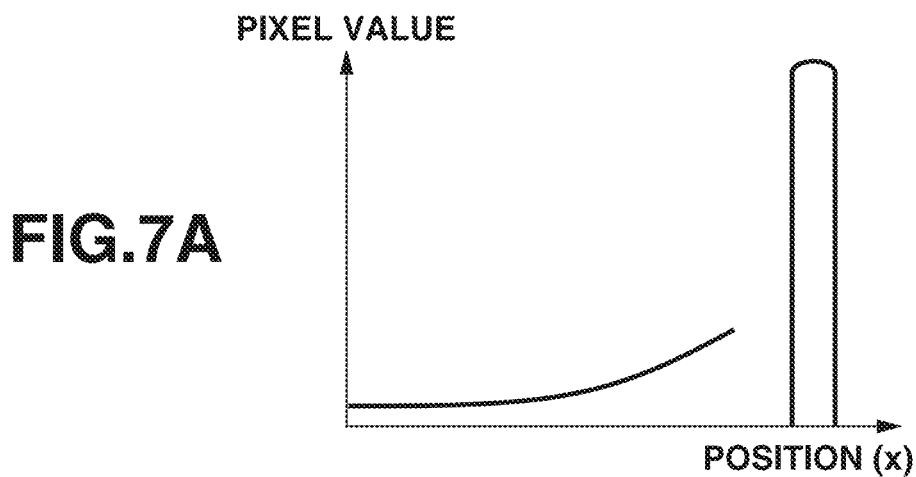
FIGS. 7A to 7C are graphs each illustrating processing to estimate a distribution of image quality degradation.
Figure 7B:
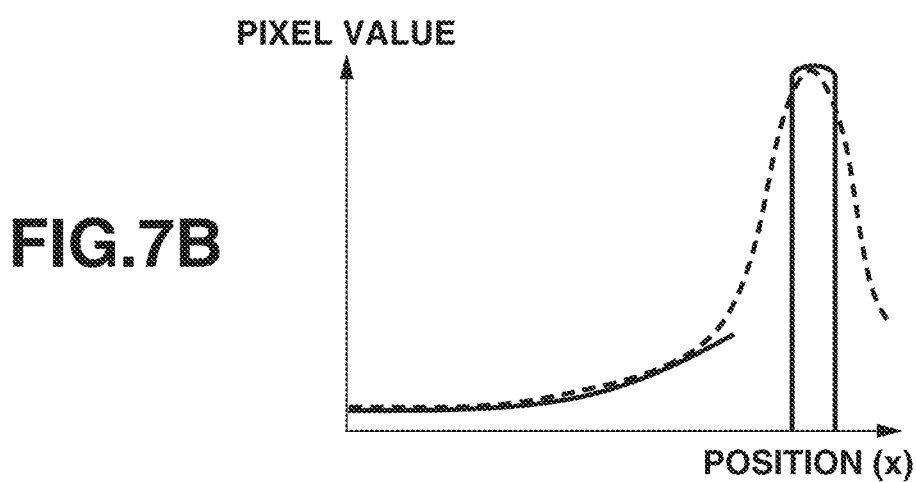

In S3052, the generation unit 209 executes fitting of a Gaussian function to the pixel values of the combined image. In the fitting, the pixel values of the high-luminance region and the pixel values of the overlapping region in the combined image are used, and a center (peak) position of the Gaussian function is set to a centroid coordinate B of the high-luminance region, for example as illustrated in FIG. 6B. FIG. 7A illustrates a profile of the pixel values on a dashed line in the combined image illustrated in FIG. 6B. FIG. 7B illustrates a profile of the pixel values at positions corresponding to the dashed line illustrated in FIG. 6B expressed in the Gaussian function obtained by the above-described fitting. The dashed line illustrated in FIG. 6B indicates a straight line passing through a center coordinate A of the overlapping region and the centroid coordinate B of the high-luminance region. Performing the fitting in this operation makes it possible to calculate the distribution of the degree of image quality degradation in the region other than the overlapping region of the first image. The fitting in this operation is performed on a two-dimensional combined image; however, the profile of the pixel values is simplified into one dimension (x direction illustrated in FIG. 6B) to make the description easy. The function used for the fitting is not limited to a Gaussian function, and a damping function, such as an exponential function, may be used. Further, it is unnecessary to perform the fitting on all of the pixel values of the combined image. The fitting may be performed on at least a part of the pixel values as long as the degree of image quality degradation can be sufficiently estimated.

Figure 7C:
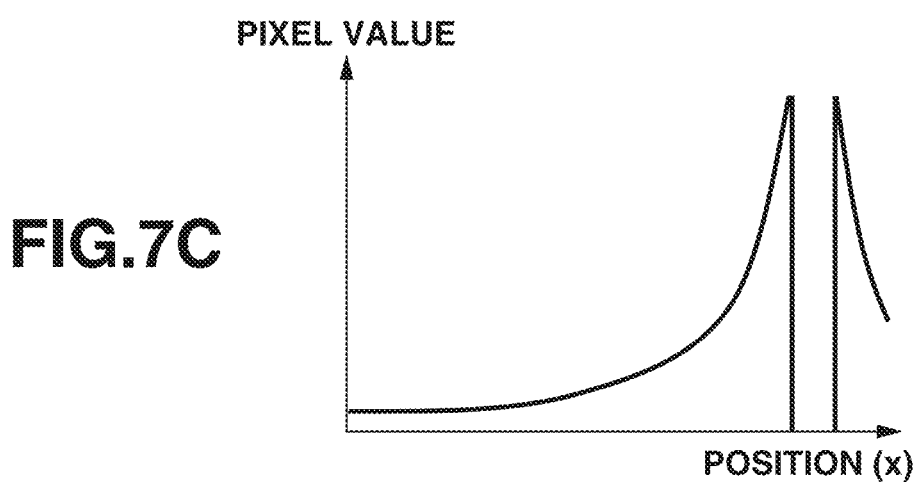

In S3053, the generation unit 209 generates the degraded image data representing the distribution of the degree of image quality degradation in the first image. More specifically, the generation unit 209 generates the degraded image data representing the subtraction result by subtracting the pixel values of the extracted image from the pixel values of the image representing Gaussian distribution, which is obtained through the fitting in S3052. As described above, the subtraction result (hereinafter, referred to as a degraded image) represents the distribution of the degree of image quality degradation in the first image. In the subtraction processing, a negative value is clipped at zero. FIG. 6C illustrates the distribution of the degree of image quality degradation in the first image. FIG. 7C illustrates the profile of the pixel values at the positions corresponding to the dashed line illustrated in FIG. 6B, in the distribution of the degree of image quality degradation. As illustrated in FIG. 7C, the degree of image quality degradation is varied for each region, depending on the position and the luminance of the high-luminance region, and the degree of image quality degradation becomes larger as the position comes closer to the high-luminance region.

Figure 8A:
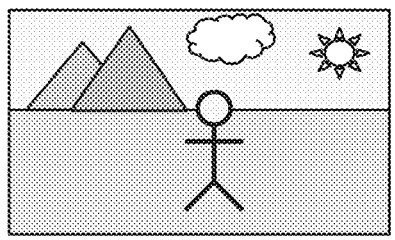
FIGS. 8A to 8C are diagrams each illustrating processing to correct a first image.
Figure 8B:
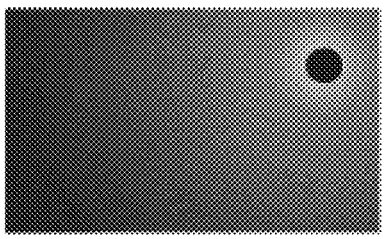
Figure 8C:
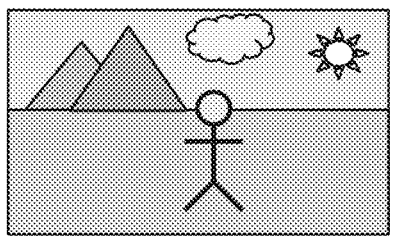

In S306, the correction unit 203 corrects the first image based on the first image data and the degraded image data. More specifically, the correction unit 203 subtracts the pixel values of the degraded image represented by the degraded image data from the pixel values of the first image represented by the first image data. FIG. 8A illustrates the same image as the first image to be corrected illustrated in FIG. 3B. FIG. 8B illustrates the same distribution as the distribution of the degree of image quality degradation in the first image illustrated in FIG. 6C. FIG. 8C illustrates the first image corrected through the subtraction processing in this operation. As a result of this correction, the image in which the image quality degradation, such as flare, has been reduced can be obtained without reducing the brightness of the sun (high-luminance object). The corrected first image data obtained may be stored in a storage device, such as the HDD 15, or may be output to an external device.

Effects of First Exemplary Embodiment

As described above, the image processing apparatus according to the present exemplary embodiment acquires the data representing the flare distribution in the overlapping region of the first image based on the first image that includes the high-luminance region and the second image that includes the overlapping region with the first image and does not include the high-luminance region. In addition, the image processing apparatus acquires the data representing the position of the high-luminance region in the first image. Based on the acquired data, the image processing apparatus generates the data representing the flare distribution in the first image. Based on the generated data, the image processing apparatus corrects the first image. As a result, it is possible to obtain the distribution of the degree of image quality degradation in the first image based on the position and the luminance of the high-luminance region in the first image. Accordingly, it is possible to reduce the image quality degradation caused by the high-luminance object with high accuracy.

In the first exemplary embodiment, to obtain the image that includes the high-luminance object in the imaging range and the image that does not include the high-luminance object in the imaging range, the imaging range is changed by moving the imaging apparatus without changing the exposure condition and the zoom magnification. In a second exemplary embodiment, the image quality degradation of the image to be corrected is reduced by using image data obtained through imaging twice at different zoom magnifications. The hardware configuration of the image processing apparatus 1 according to the present exemplary embodiment is the same as the hardware configuration of the image processing apparatus 1 according to the first exemplary embodiment, and therefore a description thereof is omitted. Hereinafter, differences between the present exemplary embodiment and the first exemplary embodiment are mainly described. The configuration that is the same as the configuration according to the first exemplary embodiment is described by using the same reference numerals.

<Functional Configuration of Image Processing Apparatus>

Figure 9:
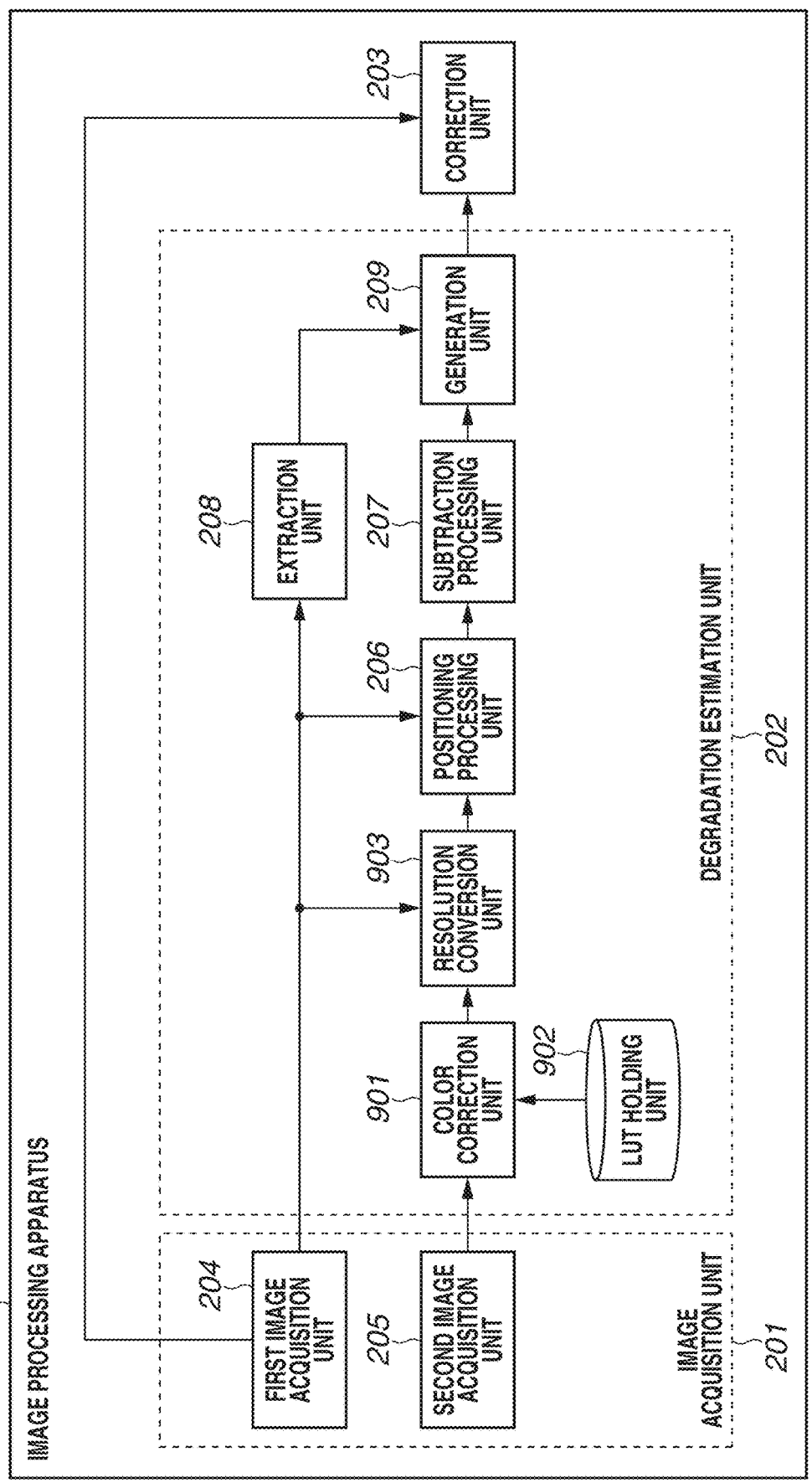
FIG. 9 is a block diagram illustrating an example of a functional configuration of the image processing apparatus.

FIG. 9 illustrates an example of a functional configuration of the image processing apparatus 1. The image processing apparatus 1 includes the image acquisition unit 201, the degradation estimation unit 202, and the correction unit 203.

The image acquisition unit 201 includes the first image acquisition unit 204 and the second image acquisition unit 205. The first image acquisition unit 204 acquires first image data and transmits the acquired first image data to the degradation estimation unit 202 and the correction unit 203. The first image includes a high-luminance region. The second image acquisition unit 205 acquires second image data and transmits the acquired second image data to the degradation estimation unit 202. The second image does not include a high-luminance region, and the second image includes an overlapping region with the first image. The first image according to the present exemplary embodiment is obtained by imaging in which a zoom magnification is lower than a zoom magnification in imaging to obtain the second image. Both the first image and the second image according to the present exemplary embodiment are color images; however, they may be grayscale images. In a case of the grayscale images, a color correction unit 901 performs correction processing on one channel for each pixel.

The degradation estimation unit 202 estimates a degree of image quality degradation in the first image. The degradation estimation unit 202 includes the color correction unit 901, a lookup table (LUT) holding unit 902, a resolution conversion unit 903, the positioning processing unit 206, the subtraction processing unit 207, the extraction unit 208, and the generation unit 209. The color correction unit 901 refers to a color correction lookup table to perform color correction processing on the second image. In the second image, image quality degradation caused by the high-luminance object hardly occurs as compared with the first image. On the other hand, a distance between lenses is increased due to a high zoom magnification in the imaging, and the number of times of light reflecting inside the lens barrel is increased. Accordingly, the entire image is brightened. The color correction unit 901 corrects the color of the second image to suppress an adverse effect on the correction processing performed by the correction unit 203 caused by the phenomenon in which the entire image is brightened. Since the resolution is different between the first image and the second image due to difference of the zoom magnification, the resolution conversion unit 903 converts resolution of the second image to make the resolution of the first image and the resolution of the second image equal to each other. The positioning processing unit 206, the subtraction processing unit 207, the extraction unit 208, and the generation unit 209 are similar to those in the first exemplary embodiment, and descriptions thereof are omitted.

<Processing Executed by Image Processing Apparatus>

Figure 19:
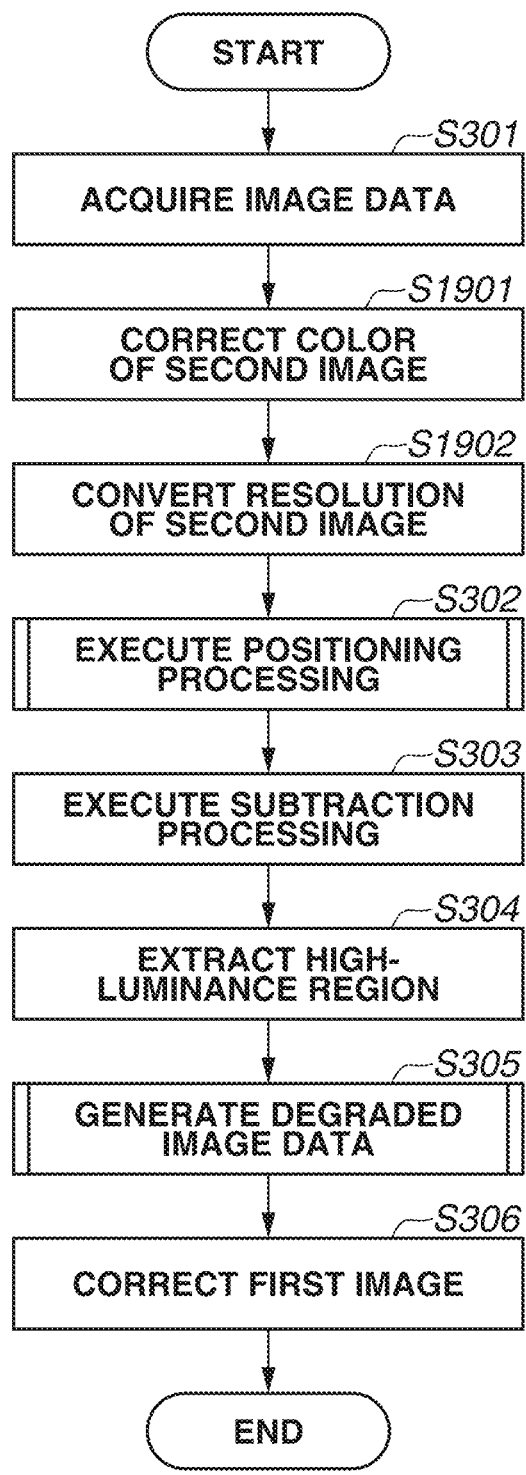
FIG. 19 is a flowchart illustrating a flow of processing executed by the image processing apparatus.

FIG. 19 is a flowchart illustrating a flow of processing executed by the image processing apparatus 1.

Figure 10:
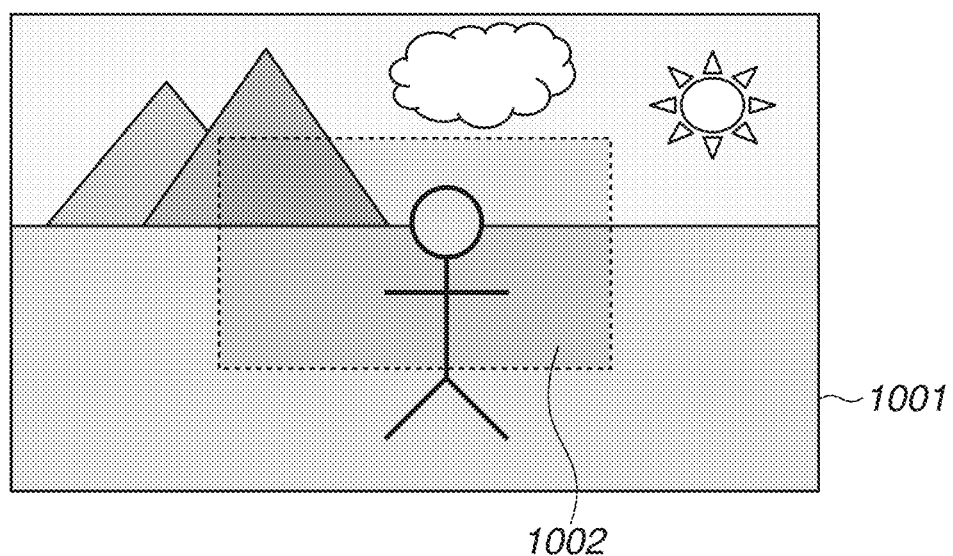
FIG. 10 is a diagram illustrating an example of a captured image.

Processing in S301 is similar to that in the first exemplary embodiment, and therefore a description of the processing is omitted. An imaging method to obtain the first image data and the second image data is described below. FIG. 10 is a diagram illustrating an example of a captured image according to the present exemplary embodiment. An image 1001 in FIG. 10 is an image obtained through imaging in which the high-luminance object is included in the imaging range. An image 1002 in FIG. 10 is an image obtained through imaging in which the high-luminance object is not included in the imaging range. The imaging to obtain the image 1001 is performed at a lower zoom magnification than that in the imaging to obtain the image 1002. Since the sun as the high-luminance object is not included in the imaging range of the image 1002, an occurrence amount of flare in the image 1002 is smaller than that in the image 1001, whereby brightness of the same object in the image 1002 is lower than that in the image 1001 even under the same exposure condition. In the present exemplary embodiment, the image 1001 corresponds to the first image, and the image 1002 corresponds to the second image.

In S1901, the color correction unit 901 refers to the color correction LUT to correct the color of the second image. FIG. 11 illustrates an example of the color correction LUT held by the LUT holding unit 902. The color correction LUT is a lookup table that is preliminarily created by imaging a color chart that does not include a high-luminance region under the same exposure condition and at the same zoom magnification as those in the imaging of the first image and as those in the imaging of the second image. The color correction LUT holds a correspondence relationship between color information (R value, G value, and B value) in imaging at relatively high zoom magnification and color information (R' value, G' value, and B' value) in imaging at relatively low zoom magnification. As illustrated in FIG. 11, the R' value, the G' value, and the B' value are generally higher than the R value, the G value, and the B value. In this operation, the color correction unit 901 refers to the color correction LUT to convert the color of the second image so that the R' value, the G' value, and the B' value become the R value, the G value, and the B value, respectively. In the RGB color space, as for the pixel value between points where the correspondence relationship of each of the points is held by the LUT, a corresponding value is calculated through interpolation processing using points near the pixel value from among the points where the correspondence relationship thereof is held by the LUT. The color correction processing in this operation is not limited to the method using the table. For example, a matrix that converts the R' value, G' value, and the B' value into the R value, the G value, and the B value, respectively, may be preliminary created, and calculation processing using the created matrix may be performed.

Figure 12A:
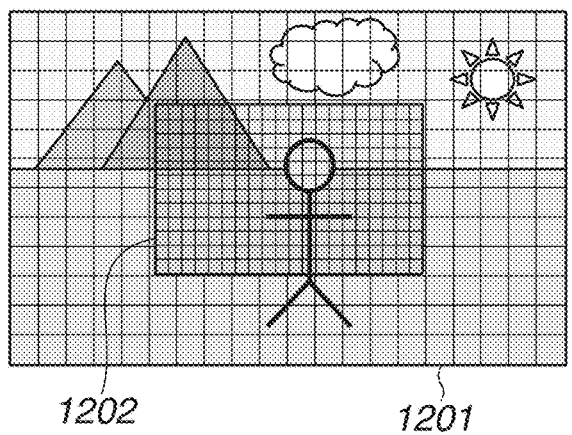
FIGS. 12A and 12B are diagrams each illustrating a resolution conversion.
Figure 12B:
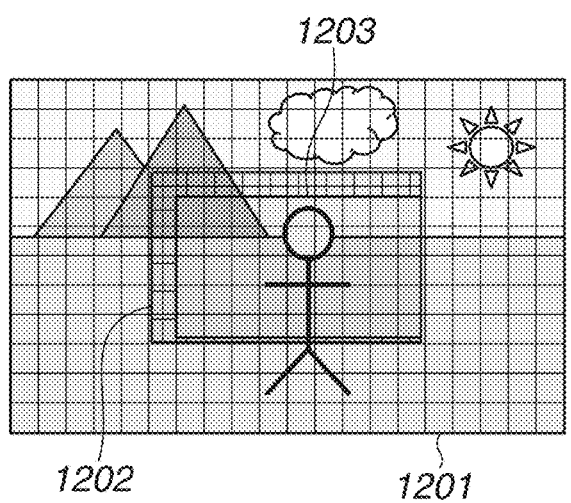

In S1902, the resolution conversion unit 903 converts the resolution of the second image so that the resolution of the second image becomes equal to the resolution of the first image. FIGS. 12A and 12B are diagrams illustrating the resolution conversion in this operation. FIG. 12A is a diagram illustrating a state where the resolution of a first image 1201 and the resolution of a second image 1202 are different from each other. As illustrated in FIG. 12A, the number of pixels of the first image is equal to the number of pixels of the second image. Thus, if the zoom magnifications are different from each other, the resolutions are different from each other. To perform the positioning processing in S302, the resolution of the second image is converted in S1902. A second image 1203 in FIG. 12B is the second image in which the resolution has been converted so as to be equal to the resolution of the first image 1201. A conversion magnification for the resolution conversion is calculated by using the zoom magnification in the imaging to obtain the first image and the zoom magnification in the imaging to obtain the second image.

Figure 13A:
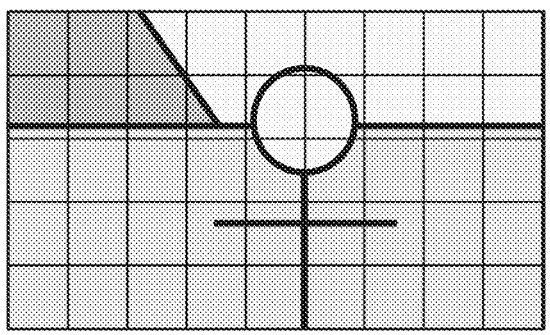
FIGS. 13A to 13C are diagrams each illustrating positioning processing and subtraction processing.
Figure 13B:
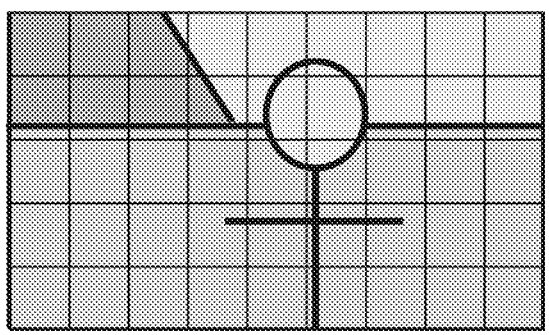
Figure 13C:
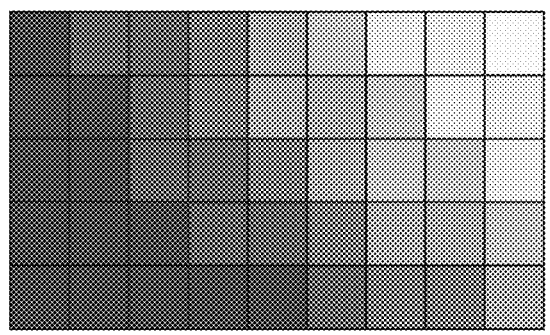

In S302, the positioning processing unit 206 calculates the overlapping region of the first image 1201 and the second image 1203, and performs the positioning processing on the overlapping region. FIG. 13A illustrates an image obtained by cutting out the overlapping region from the first image 1201, and FIG. 13B illustrates an image obtained by cutting out the overlapping region from the second image 1203 and being positioned so as to match the cut out image of FIG. 13A. In S303, the subtraction processing unit 207 subtracts the pixel values of the image of FIG. 13B from the pixel values of the image of FIG. 13A. FIG. 13C illustrates the first image obtained by subtracting the pixel values of the image of FIG. 13B from the pixel values of the image of FIG. 13A. The other processing in operations S302 to S306 is similar to the processing in the first exemplary embodiment, and therefore a description of the processing is omitted.

Effects of Second Exemplary Embodiment

As described above, the image processing apparatus according to the present exemplary embodiment corrects the image to be corrected by using the image that was captured using imaging with a different zoom magnification from that of the image to be corrected. Accordingly, it is possible to reduce the image quality degradation caused by the high-luminance object with high accuracy. In addition, it is possible to acquire the image used for correction through imaging to obtain the image to be corrected without changing the position and the direction of the imaging.

In the above-described exemplary embodiments, the image to be corrected and the image used for correction that are obtained through imaging while changing the position, the direction, or the zoom magnification of the imaging apparatus are used in the processing. In a third exemplary embodiment, an image obtained through imaging in a state where the high-luminance object in the imaging range is shielded-without changing the position, the direction, or the zoom magnification of the imaging apparatus in the imaging—is used as the image for correction. The hardware configuration, the functional configuration, and the processing contents of the image processing apparatus 1 according to the present exemplary embodiment are the same as those in the first exemplary embodiment, and therefore descriptions thereof are omitted. Hereinafter, differences between the present exemplary embodiment and the first exemplary embodiment are mainly described. The configuration that is the same as the configuration according to the first exemplary embodiment is described by using the same reference numerals.

<Imaging Method>

Figure 14A:
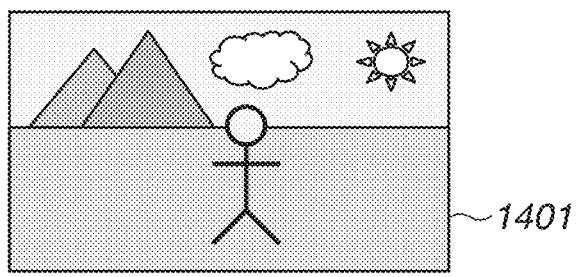
FIGS. 14A and 14B are diagrams each illustrating an example of a captured image.
Figure 14B:
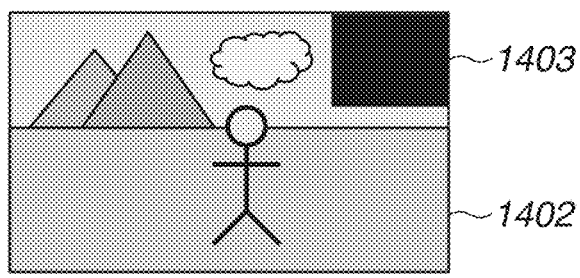

The image data acquired by the image acquisition unit 201 in S301 according to the present exemplary embodiment is image data obtained by an imaging method described below. The imaging method is described with reference to FIGS. 14A and 14B. An image 1401 illustrated in FIG. 14A is an image in which the high-luminance object is included in the imaging range. An image 1402 illustrated in FIG. 14B is an image in which the high-luminance object is not included in the imaging range. Imaging to obtain the image 1401 and imaging to obtain the image 1402 are the same in terms of the position, the direction, and the zoom magnification of the imaging apparatus; however, the high-luminance object in the imaging range is hidden by a shielding plate in the imaging to obtain the image 1402. A region 1403 in the image 1402 is a region where light from the high-luminance object is shielded by the shielding plate. The shielding plate is a plate disposed between the lens of the imaging apparatus and an object to prevent the high-luminance object from being captured. A plate with low transmittance is used as the shielding plate. An object that shields the high-luminance object is not limited to the plate and may also be, for example, a shielding member provided to the imaging apparatus.

Effects of Third Exemplary Embodiment

As described above, the imaging processing apparatus according to the present exemplary embodiment corrects the image to be corrected by using, as the image for correction, the image obtained through imaging in the state where the light from the high-luminance object is shielded. Accordingly, it is possible to reduce the image quality degradation caused by the high-luminance object with a high accuracy. In addition, it is possible to acquire the image used for correction through imaging to obtain the image to be corrected without changing the position, the direction, and the zoom magnification of the imaging.

In a fourth exemplary embodiment, an imaging apparatus 13 that performs imaging to obtain the first image data and the second image data is described.

<Functional Configuration of Imaging Apparatus>

Figure 15:
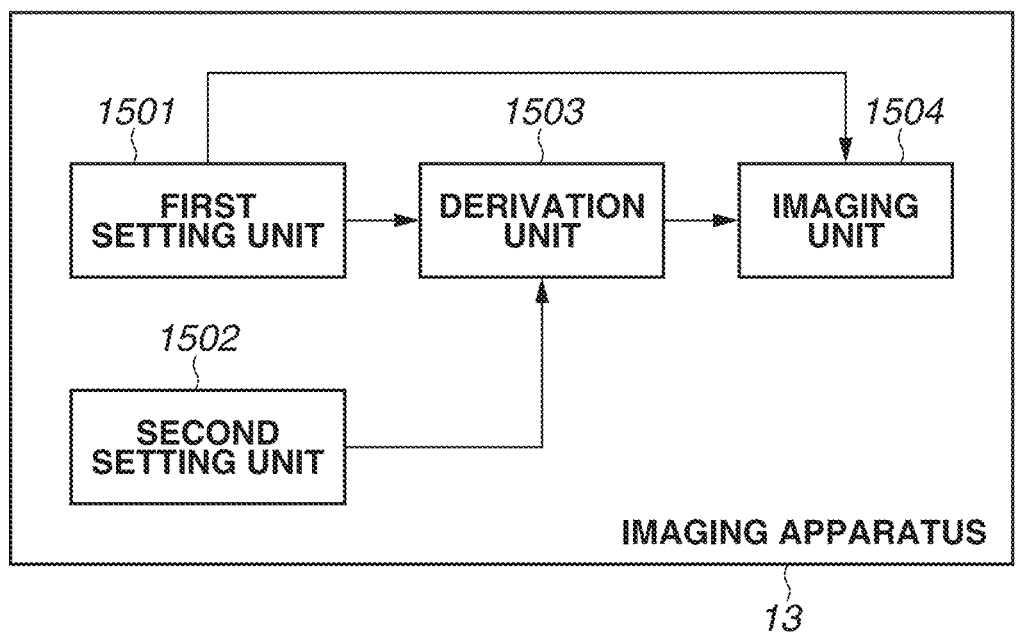
FIG. 15 is a block diagram illustrating a configuration example of an imaging apparatus.

FIG. 15 is a diagram illustrating a functional configuration example of the imaging apparatus 13 according to the present exemplary embodiment. The imaging apparatus 13 includes a first setting unit 1501, a second setting unit 1502, a derivation unit 1503, and an imaging unit 1504. The first setting unit 1501 sets an imaging condition, such as exposure and focus, for the imaging to obtain the first image data based on information representing an instruction from the user. The information representing the instruction from the user is input via a monitor and a button provided to the imaging apparatus 13. The second setting unit 1502 sets whether to correct the first image based on the information representing the instruction from the user. The derivation unit 1503 derives an imaging condition for the imaging to obtain the second image data in a case where the second setting unit 1502 is set so as to correct the first image. The imaging condition derived at this time is an imaging condition in which the high-luminance object is not included in the imaging range. The imaging unit 1504 performs imaging under the imaging condition set by the first setting unit 1501 and imaging under the imaging condition derived by the derivation unit 1503. In the imaging under the imaging condition derived by the derivation unit 1503, the high-luminance object is detected by using a photometric function, and the imaging is performed in a state where a region corresponding to the high-luminance object is shielded. The shielding may be automatically performed by using a shielding member provided to the imaging apparatus 13, or a position to be shielded may be notified to the user through display on a monitor or an electronic viewfinder (EVF). An example of the shielding member is a liquid crystal film attached to a front surface of the lens. To change the imaging range, the imaging unit 1504 controls an automatic pan head connected to the imaging apparatus 13, thereby changing the imaging range. To change the zoom magnification, the imaging unit 1504 controls an automatic zoom lens provided to the imaging apparatus 13, thereby changing the imaging range.

Modification of Fourth Exemplary Embodiment

Figure 16A:
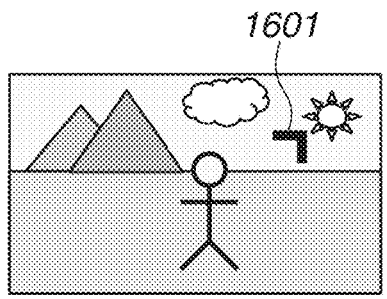
FIGS. 16A to 16C are diagrams each illustrating a guidance function to support imaging.
Figure 16B:
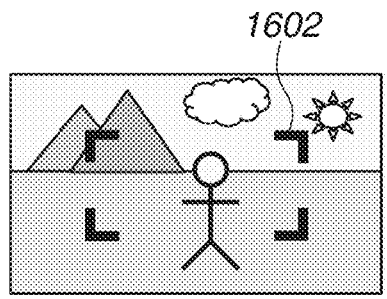
Figure 16C:
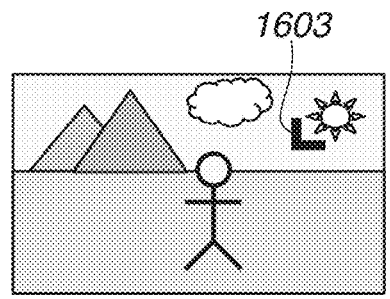

The imaging apparatus 13 may further include a guide display control unit. FIG. 16A illustrates a state of the imaging performed to obtain the second image data acquired in the first exemplary embodiment. The guide display control unit prompts the user to change the imaging range to the lower left of a range indicated by a marker 1601. FIG. 16B illustrates a state of the imaging performed to obtain the second image data acquired in the second exemplary embodiment. The guide display control unit prompts the user to change the imaging range inward of a range indicated by a marker 1602. FIG. 16C illustrates a state of the imaging performed to obtain the second image data acquired in the third exemplary embodiment. The guide display control unit prompts the user to shield a high-luminance object in a range indicated by a marker 1603. The markers illustrated in FIGS. 16A to 16C are each superimposed on an image to be captured and are each displayed on the monitor or the EVF.

The imaging apparatus 13 may further include a correction unit and a storage unit. The correction unit corrects the first image obtained under the imaging condition set by the first setting unit 1501 by the above-described method by using the second image obtained under the imaging condition set by the second setting unit 1502. The storage unit stores the first image data representing the corrected first image.

In addition, in the present exemplary embodiment, the derivation unit 1503 derives the imaging condition in the imaging to obtain the second image data. Alternatively, the imaging condition may be set based on the information representing the instruction from the user in a manner similar to the first setting unit 1501.

The second setting unit 1502 according to the present exemplary embodiment sets whether to correct the first image based on the information representing the instruction from the user. Alternatively, the second setting unit 1502 may determine whether image quality degradation occurs based on the first image. For example, in a case where the first image includes a pixel that has a luminance value greater than or equal to a threshold, the second setting unit 1502 determines that the image quality degradation occurs.

Each of the first setting unit 1501 and the second setting unit 1502 according to the present exemplary embodiment is a setting unit to set the imaging condition; however, it may be a setting unit to set an imaging mode in the imaging. For example, the first setting unit 1501 sets, as an imaging mode, either a first mode in which imaging is performed while the high-luminance object is included in the imaging range or a second mode in which imaging is performed while the high-luminance object is not included in the imaging range. After the imaging is performed in the mode set by the first setting unit 1501, the second setting unit 1502 sets, as an imaging mode, a mode that has not been set by the first setting unit 1501 of the first mode and the second mode.

In the present exemplary embodiment, the imaging apparatus 13 includes the first setting unit 1501, the second setting unit 1502, and the derivation unit 1503; however, the image processing apparatus 1 according to any of the first to third exemplary embodiments may include the above-described configuration.

Effects of Fourth Exemplary Embodiment

As described above, the imaging apparatus according to the present exemplary embodiment derives the imaging condition suitable for obtaining the image for correction based on the instruction from the user, and the imaging apparatus performs the imaging. Accordingly, it is possible to easily acquire the image used to reduce the image quality degradation caused by the high-luminance object with a high accuracy.

In the above-described exemplary embodiments, one image for correction is used for one image to be corrected; however, the number of images is not limited thereto. For example, correction processing may be performed by using two images each for performing a correction on one image to be corrected, and one of two resultant images that has reduced image quality degradation better than the other may be used as the correction result. Alternatively, correction processing may be performed by using one image for performing a correction on two images to be corrected.

In the above-described exemplary embodiments, the case has been described where one region is extracted as the high-luminance region; however, a plurality of regions may be extracted. In this case, in the fitting performed to estimate the image quality degradation, a damping function centering on the each of the high-luminance regions is used.

In the above-described exemplary embodiments, the image quality degradation is estimated by performing the fitting on the pixel values of the combined image; however, processing may be added to reduce partial image quality degradation, such as ghost, with a high accuracy. For example, in a case where the ghost occurs in the first image to be corrected, an image that includes a position point-symmetric to the image of the high-luminance object in the first image about the center of the first image is prepared as the second image for correction. The ghost is likely to occur particularly clearly at the position point-symmetric to the image of the high-luminance object about the center of the image. Accordingly, by including the above-described point-symmetric position in the second image, it is possible to include, in the second image, the position where the ghost occurs in the first image. In S3052, to estimate the image quality degradation expanded from the high-luminance region with a high accuracy, the generation unit 209 does not use the pixel values of the combined image at the position corresponding to the ghost in the fitting. In S3053, the generation unit 209 subtracts the pixel values of the extracted image from the pixel values of the image representing Gaussian distribution obtained through the fitting in S3052 to generate the degraded image data representing the subtraction result. Further, the generation unit 209 extracts the pixel values at the position corresponding to the ghost from the first image subjected to the subtraction processing obtained in S303, and the generation unit 209 adds the extracted pixel values to the pixel values of the degraded image. As a result, it is possible to generate the degraded image data representing the distribution of the partial image quality degradation, such as the ghost, in addition to the image quality degradation expanded from the high-luminance region. By correcting the first image using the degraded image data, it is possible to reduce the image quality degradation expanded from the high-luminance region and the partial image quality degradation, such as the ghost, with a high accuracy. To extract the pixel values at the position corresponding to the ghost from the first image subjected to the subtraction processing, the pixel values that are greater than or equal to the predetermined threshold are extracted. To prepare the second image, for example, a position where the ghost occurs particularly clearly is determined based on the position of the high-luminance region in the first image after the first image is obtained by imaging, and the imaging is performed so as to include the determined position in the second image. In the imaging to obtain the second image, the position where the ghost occurs particularly clearly is notified to the user by using a marker. In the above-described example of the processing, the second image is prepared while the position point-symmetric to the image of the high-luminance object about the center of the image is estimated as the position where the ghost occurs. Alternatively, the second image may be prepared while a position on a straight line passing through the image of the high-luminance object and the center of the image is estimated as the position where the ghost occurs. Further, the second image may be prepared while a region near the position point-symmetric to the image of the high-luminance object about the center of the image is estimated as the position where the ghost occurs. In this example, the region near the point-symmetric position is a region from the point-symmetric position to a position separated by a predetermined distance therefrom. Moreover, whether to perform the above-described processing to reduce the partial image quality degradation, such as the ghost, with a high accuracy in addition to the processing according to the above-described exemplary embodiments may be switched in response to an instruction from the user. The instruction from the user may be received via the UI displayed on the display. Moreover, in the above-described exemplary embodiments, the distribution of the degree of image quality degradation in the region other than the overlapping region is calculated by the fitting; however, the method of calculating the distribution of the degree of image quality degradation is not limited thereto. For example, in a case where only the partial image quality degradation, such as the ghost, occurs in the overlapping region, the result of the subtraction processing by the subtraction processing unit 207 may be regarded as the distribution of the image quality degradation in the first image without performing the fitting. In a case where the luminance value at an end part of the overlapping region is lower than a threshold in the result of the subtraction processing by the subtraction processing unit 207, it is determined that expansion of the image quality degradation in the region other than the overlapping region is not present, and the degraded image data is generated without performing the fitting.

In the first to third exemplary embodiments, the imaging method to obtain the first image data and the imaging method to obtain the second image data are different from each other; however, the imaging methods may be combined to perform the imaging. For example, the imaging range may be changed by moving the imaging apparatus and by changing the zoom position.

The image acquisition unit 201 according to the above-described exemplary embodiments acquires the first image data and the second image data that are preliminarily stored in a storage device, such as the HDD 15. Alternatively, the image acquisition unit 201 may acquire the image data directly from the imaging apparatus 13.

In the above-described exemplary embodiments, the first image data and the second image data are acquired, and the positioning processing, the subtraction processing, and the extraction of the high-luminance region in the first image are performed; however, the processing is not limited thereto. For example, the first image data representing the first image subjected to the subtraction processing and the data representing the position and the pixel values of the high-luminance region in the first image may be preliminarily generated and stored in a storage device, such as the HDD 15. The generation unit 209 may acquire the above-described data stored in the storage device and use the acquired data to generate the degraded image data.

The generation unit 209 according to the above-described exemplary embodiments transmits the generated degraded image data to the correction unit 203. Also, the generation unit 209 may output the degraded image data to an external apparatus.

The extraction unit 208 according to the above-described exemplary embodiments extracts the high-luminance region in the first image, and the extraction unit 208 generates the information indicating the position of the extracted region and the pixel values in the extracted region. Alternatively, the extraction unit 208 may generate information indicating only the position of the extracted region. In this case, the fitting by the generation unit 209 is performed on the pixel values of the overlapping region in the combined image.

According to various embodiments, it is possible to reduce the image quality degradation caused by the high-luminance object with high accuracy.

OTHER EMBODIMENTS

Some embodiments can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that the claims are not limited to the disclosed exemplary embodiments. The scope of the following claims is to be accorded the broadest interpretation so as to encompass all such modifications and equivalent structures and functions.

This application claims priority to Japanese Patent Application No. 2018-035568, which was filed on Feb. 28, 2018 and which is hereby incorporated by reference herein in its entirety.

What is claimed is:

1. An image processing apparatus, comprising:
a first acquisition unit configured to acquire first data based on a first image that includes a high-luminance region and a second image that includes an overlapping region with the first image and that does not include the high-luminance region, the first data representing flare distribution in the overlapping region in the first image;
a second acquisition unit configured to acquire second data representing a position of the high-luminance region in the first image;
a generation unit configured to generate third data representing flare distribution in the first image based on the first data and the second data; and
a correction unit configured to correct the first image based on the third data.

2. The image processing apparatus according to claim 1, wherein the flare distribution in the first image represented by the third data includes flare distribution of a region other than the overlapping region in the first image.

3. The image processing apparatus according to claim 1, wherein the generation unit calculates the flare distribution in the first image by performing fitting to a damping function centering on a position of the high-luminance region represented by the second data on at least a part of pixel values of the flare distribution represented by the first data.

4. The image processing apparatus according to claim 3, wherein the second data is data that further represents pixel values of the high-luminance region, and
wherein the generation unit performs the fitting on at least a part of the pixel values of the flare distribution represented by the first data and at least a part of pixel values of the high-luminance region.

5. The image processing apparatus according to claim 3, wherein the damping function is a Gaussian function.

6. The image processing apparatus according to claim 3, wherein the damping function is an exponential function.

7. The image processing apparatus according to claim 1, wherein an imaging range in imaging to obtain the first image is different from an imaging range in imaging to obtain the second image.

8. The image processing apparatus according to claim 7, wherein the imaging to obtain the first image and the imaging to obtain the second image are different in at least one of a position and a direction of the imaging.

9. The image processing apparatus according to claim 7, wherein the imaging to obtain the first image and the imaging to obtain the second image are different in zoom magnification.

10. The image processing apparatus according to claim 7, wherein light from a high-luminance object in the imaging range is shielded in the imaging to obtain the second image.

11. The image processing apparatus according to claim 1, further comprising a third acquisition unit configured to acquire first image data representing the first image and second image data representing the second image,
wherein the first acquisition unit generates the first data based on the first image data and the second image data, and
wherein the second acquisition unit generates the second data based on the first image data.

12. The image processing apparatus according to claim 11, wherein the first acquisition unit generates the first data by performing positioning processing on the second image so as to match a position of an object included in the first image with a position of the object included in the second image and by subtracting pixel values of the second image subjected to the positioning processing from pixel values of the first image.

13. The image processing apparatus according to claim 12, wherein the first acquisition unit converts a resolution of the second image to match a resolution of the first image with the resolution of the second image, and performs the positioning processing on the second image of which the resolution has been converted.

14. The image processing apparatus according to claim 13, wherein the first acquisition unit corrects a color of the second image, and converts the resolution of the second image of which the color has been corrected.

15. The image processing apparatus according to claim 14,
wherein the first acquisition unit corrects the color of the second image by using a table for color correction, and
wherein the table is created based on pixel values of a third image and pixel values of a fourth image, the third image being obtained through imaging of a color chart under an imaging condition the same as an imaging condition of the imaging to obtain the first image, and the fourth image being obtained through imaging of the color chart under an imaging condition the same as an imaging condition of the imaging to obtain the second image.

16. The image processing apparatus according to claim 1, wherein the flare includes ghost.

17. An image processing apparatus, comprising:
an acquisition unit configured to acquire first image data representing a first image that includes a high-luminance region and second image data representing a second image that includes an overlapping region with the first image and that does not include the high-luminance region; and
an output unit configured to output data representing flare distribution in the first image based on the first image data and the second image data,
wherein the flare distribution in the first image includes flare distribution in a region other than the overlapping region in the first image.

18. An image processing method, comprising:
acquiring first data based on a first image that includes a high-luminance region and a second image that includes an overlapping region with the first image and that does not include the high-luminance region, the first data representing flare distribution in the overlapping region in the first image;
acquiring second data representing a position of the high-luminance region in the first image;
generating third data representing flare distribution in the first image based on the first data and the second data; and
correcting the first image based on the third data.

19. An image processing method, comprising:
acquiring first image data representing a first image that includes a high-luminance region and second image data representing a second image that includes an overlapping region with the first image and that does not include the high-luminance region; and
outputting data representing flare distribution in the first image based on the first image data and the second image data,
wherein the flare distribution in the first image includes flare distribution in a region other than the overlapping region in the first image.

20. A non-transitory computer-readable storage medium storing instructions that, when executed by a computer, cause the computer to perform an image processing method, the image processing method comprising:
acquiring first data based on a first image that includes a high-luminance region and a second image that includes an overlapping region with the first image and that does not include the high-luminance region, the first data representing flare distribution in the overlapping region in the first image;
acquiring second data representing a position of the high-luminance region in the first image;
generating third data representing flare distribution in the first image based on the first data and the second data; and
correcting the first image based on the third data.

* * * * *